Nov. 9, 1937.  P. C. FISH  2,098,382
MOLD FOR MANUFACTURING COMPOSITE VITREOUS TILE AND CONCRETE STAVES
Original Filed Aug. 1, 1931
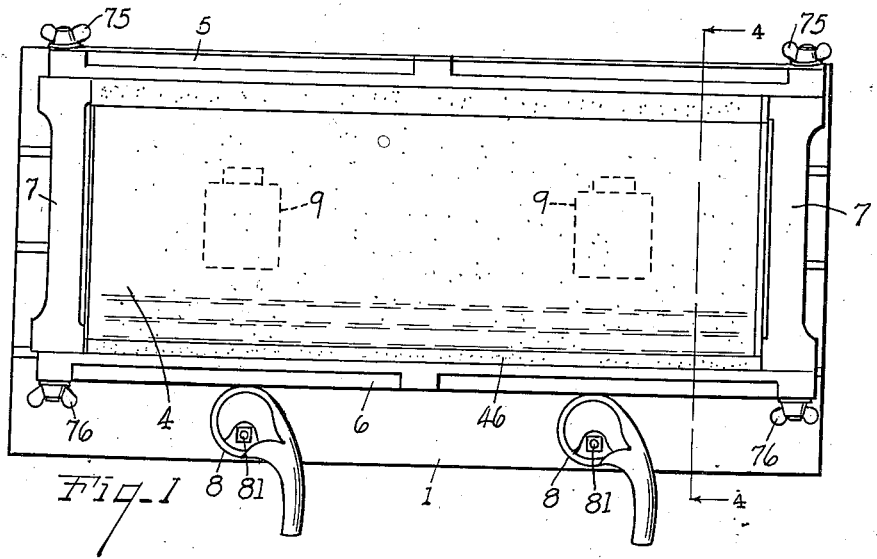
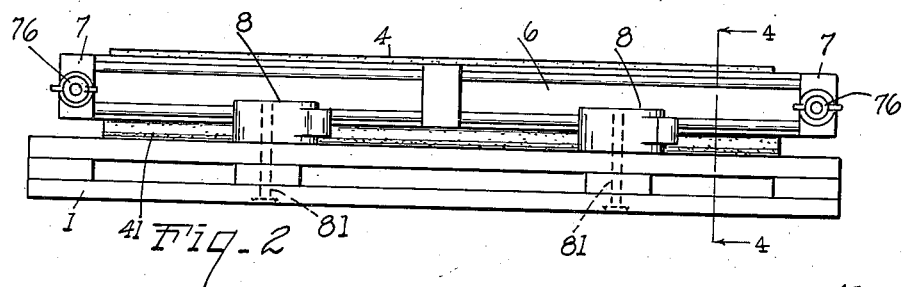
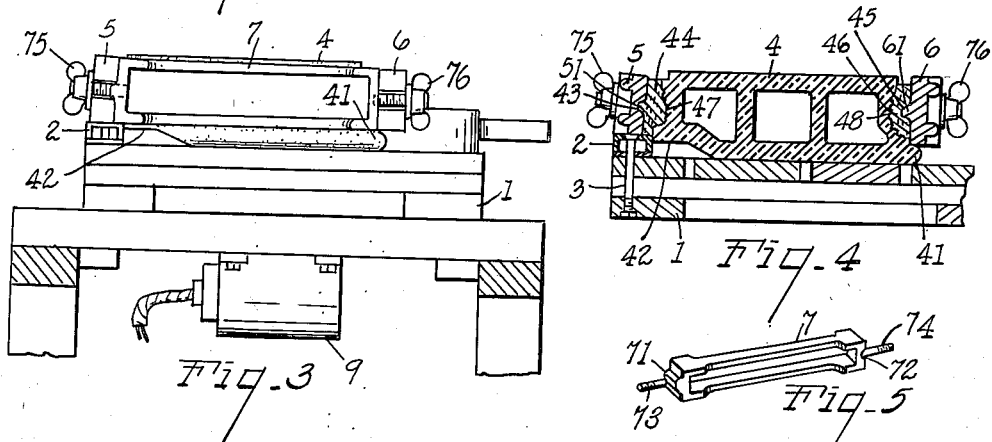
INVENTOR.
Percy C. Fish
BY
ATTORNEY.

Patented Nov. 9, 1937

2,098,382

UNITED STATES PATENT OFFICE 2,098,382

MOLD FOR MANUFACTURING COMPOSITE VITREOUS TILE AND CONCRETE STAVES

Percy C. Fish, Kalamazoo, Mich.

Original application August 1, 1931, Serial No. 554,430. Divided and this application July 17, 1935, Serial No. 31,789

4 Claims. (Cl. 25—121)

This invention relates to improved mold for manufacturing a stave and is a division of my application Serial No. 554,430, filed Aug. 1, 1931.

The objects of this invention are:

First, to provide an improved mold for manufacturing composite staves.

Objects pertaining to details and economies of construction and operation will appear from the description to follow.

A mold structure embodying the features of my invention and constituting the apparatus for carrying out the method is illustrated in the accompanying drawing, in which:

Fig. 1 is a plan view of a mold structure with one of my improved staves in position, the vibrator on the under side thereof being indicated by dotted lines.

Fig. 2 is a front elevation view of the mold structure as seen in Fig. 1.

Fig. 3 is a detail left hand end elevation view of the mold with the supporting bench fragmentary and in section.

Fig. 4 is a detail sectional elevation view on line 4—4 of Figs. 1 and 2, the right hand portion of the base being broken away.

Fig. 5 is a reduced detail perspective view of one of the interchangeable mold ends.

The parts will be identified by their numerals of reference which are the same in all the views.

1 is the base of the mold which is rectangular in form, bearing a supporting stop rail 2 at the back edge which is secured to the base 1 by bolts 3 (see Fig. 4). 4 is the hollow vitreous tile provided with a projecting rib 41 at one edge and with a corresponding depression 42 at the opposite edge, the same being of usual hollow tile construction with hollows extending from end to end, top to bottom.

The mold is comprised of a rear side form rail 5 containing a longitudinal groove 51 to form a tongue 43 in the concrete portion 44 of the composite tile after it has been molded.

6 is the front mold rail with a longitudinal rib 61 to form a groove 45 in the concrete edge 46 of the composite tile 4. Mold ends 7 are provided with projections 71 at one end to engage in the groove 51 of the rear mold rail 5 and with a depression 72 to engage the rib 61 of the front mold rail 6.

Thread bolts 73, 74 extend through slots in the ends of the said side rails which are clamped in place by wing nuts 75, 76. The opposite edges of the vitreous tile 4 are recessed at 47 and 48 to receive the concrete borders. The supporting rail 2 forms a stop for the lower rear edge of the tile 4 and the mold and tile are clamped in place by the pair of eccentric clamp cams 8 pivoted at 81 on the base 1 (see Figs. 1, 2 and 3).

On the under side of the base of the mold are vibrator motors 9 for agitating and vibrating the mold to cause the concrete delivered thereto to settle into the forms, this being a well-known expedient for agitating molds, not necessary to be detailed here. It has the effect in this combination of uniting the cement with the tile, and accurately forming the joint by causing the fine aggregates to conform.

In use I place a vitreous stave body 4 in position on my improved base, pressing the rear edge against the stop bar 2. I then place my mold in position around the tile against the projecting rib 41 at the front and in spaced relation at the rear. I then clamp the mold against the vitreous tile body 4 by engaging the edge thereof against the stop rail 2 by the action of the eccentric cams 8 against the front bar 6. This locates the front bar 6 exactly and precisely in the proper relation to the projecting rib 41. The rear mold frame rail 5 is thus in definite spaced relation to the front edge of the stave, the parts being very firmly held in position.

Semi-fluid concrete is then introduced into the open spaces and the mold is agitated by the vibrators to cause the concrete to level down and work into the interstices. As soon as this has been accomplished the clamp cams 8 are released and the mold frame with the stave therein is passed to a curing rack to set. After the same has had time to set—twenty four hours or such a matter—the molds are removed ready for further use.

The composite vitreous stave when thus manufactured is absolutely true with tongue and groove joint, a thing substantially impossible to accomplish in an all vitreous structure, owing to the warping of the vitreous tile in the firing kiln. By this method a substantially integral tile is produced by the tongue and groove form which can be readily assembled and retained in place by the usual tie rods, the necessity of machining any of the parts being avoided, and the necessity of employing a skilled mason to lay tile is also avoided as unskilled workmen can put them in place rapidly and effectively.

I desire to claim the mold I have described specifically and also broadly, as pointed out in the appended claims.

Having thus described my invention, what I claim as new and desire to secure by Letters Patent is:

1. A mold for forming composite vitreous tile and concrete staves, comprising the base with a stop rail at the rear, a rear mold rail having a groove for forming a tongue, a front mold rail having a rib for forming a groove, end mold bars having clamps for forming a frame to cooperate with a vitreous tile having rib projections to engage said stop rail and front rail to position and hold the said rails in proper spaced relation to said vitreous tile, eccentric clamps for clamping the said positioned tile and mold against the stop rail, and a vibrator to agitate the concrete into place.

2. A mold for forming composite vitreous tile and concrete staves, comprising the base with a stop rail at the rear, a rear mold rail having a groove for forming a tongue, a front mold rail having a rib for forming a groove, end mold bars having clamps for forming a frame to cooperate with a vitreous tile having rib projections to engage said stop rail and front rail to position and hold the said rails in proper spaced relation to said vitreous tile, and eccentric clamps for clamping the said positioned tile and mold against the stop rail.

3. A mold for forming composite vitreous tile and concrete staves, comprising the base with a stop rail at the rear, a rear mold rail having a groove for forming a tongue, a front mold rail having a rib for forming a groove, end mold bars having clamps for forming a frame to cooperate with a vitreous tile having rib projections to engage said stop rail and front rail to position and hold the said rails in proper spaced relation to said vitreous tile, and clamps for clamping the said positioned tile and mold against the stop rail.

4. A mold for forming composite vitreous tile and concrete staves, comprising the base with a stop rail at the rear, a rear mold rail having a groove for forming a tongue, a front mold rail having a rib for forming a groove, end mold bars having clamps for forming a frame to cooperate with a vitreous tile having rib projections to engage said stop rail and front rail to position and hold the said rails in proper spaced relation to said vitreous tile, and clamp means to retain said mold and tile in relative position for molding.

PERCY C. FISH.